(12) United States Patent
Bulk

(10) Patent No.: US 7,406,812 B2
(45) Date of Patent: Aug. 5, 2008

(54) FLOWER SHIPPING AND ARRANGING CONTAINER & SYSTEM OF PACKAGING FLOWERS

(76) Inventor: Otto Bulk, R.R. #2, Dunnville, Ontario (CA) N1A 2W2

( * ) Notice: Subject to any disclaimer, the term of this patent is extended or adjusted under 35 U.S.C. 154(b) by 23 days.

(21) Appl. No.: 11/422,899

(22) Filed: Jun. 8, 2006

(65) Prior Publication Data

US 2007/0130826 A1    Jun. 14, 2007

Related U.S. Application Data

(60) Provisional application No. 60/595,391, filed on Jun. 29, 2005.

(51) Int. Cl.
B65B 11/58    (2006.01)
(52) U.S. Cl. .............. 53/449; 53/399; 53/456
(58) Field of Classification Search ............ 47/41.01, 47/41.1, 41.11, 41.12, 41.13, 41.14, 41.15; 53/397, 399, 443, 449, 456, 461, 390; 206/423
See application file for complete search history.

(56) References Cited

U.S. PATENT DOCUMENTS

| | | | | |
|---|---|---|---|---|
| 536,908 A | * | 4/1895 | Bailey | 206/423 |
| 1,885,879 A | * | 11/1932 | Whittington | 47/41.12 |
| 2,087,259 A | * | 7/1937 | Mortenson | 206/423 |
| 2,217,454 A | * | 10/1940 | Pfeiffer | 206/423 |
| 2,348,488 A | * | 5/1944 | McLellan et al. | 47/41.01 |
| 2,358,295 A | * | 9/1944 | Bacigalupi | 206/423 |
| 2,459,565 A | * | 1/1949 | Lee | 206/562 |
| 2,474,543 A | * | 6/1949 | McLellan | 206/423 |
| 2,763,134 A | * | 9/1956 | McDonald | 47/41.11 |
| 3,748,781 A | * | 7/1973 | Erling | 47/84 |
| 4,584,213 A | * | 4/1986 | Rentowl | 47/41.12 |
| 4,917,240 A | * | 4/1990 | Roberts et al. | 206/423 |
| 5,217,117 A | * | 6/1993 | Tsuji | 206/423 |
| 5,509,254 A | * | 4/1996 | Ullrich | 53/449 |
| 6,752,270 B1 | * | 6/2004 | Helsloot et al. | 206/423 |
| 2003/0089033 A1 | * | 5/2003 | Wimp, Jr. | 47/41.11 |
| 2005/0091917 A1 | * | 5/2005 | Brennan | 47/41.01 |
| 2006/0265951 A1 | * | 11/2006 | Foster | 47/41.11 |

* cited by examiner

Primary Examiner—Louis Huynh

(57) ABSTRACT

A flower shipping and arranging container comprising a planer flexible card having defined therein a number of apertures for receiving flower stems there through. The flower shipping and arranging container also includes sheet material wrapped around the flexible card so as to create a hollow pocket between the sheet material and a front surface of flexible card thereby creating a protected environment for the flowers.

12 Claims, 7 Drawing Sheets

FIGURE 7

| 1. COATING FLEXIBLE CARD STOCK WITH A WAX COATING. | ~302 |

| 2. DIE CUTTING CARD STOCK TO PRODUCE FLEXIBLE CARDS OF DESIRED SHAPE. | ~304 |

| 3. DIE CUTTING APERTURES IN FLEXIBLE CARDS TO RECEIVE FLOWER STEMS THERE THROUGH. | ~306 |

| 4. PLACING FLOWER STEMS THROUGH APERTURES IN THE FLEXIBLE CARD WITH FLOWER BLOOM MOUNTED ADJACENT THE FRONT SURFACE OF THE FLEXIBLE CARD. | ~308 |

| 5. WRAPPING SHEET MATERIAL AROUND THE FLEXIBLE CARD, SUCH THAT THE FRONT SURFACE IS CONCAVELY BOWED THEREBY FORMING A PROTECTIVE HOLLOW POCKET BETWEEN THE SHEET MATERIAL AND THE FRONT SURFACE OF THE FLEXIBLE CARD IN WHICH TO HOUSE THE FLOWERS. | ~310 |

FLOWER SHIPPING AND ARRANGING CONTAINER & SYSTEM OF PACKAGING FLOWERS

The present application claims the benefit of previously filed U.S. Provisional Application 60/595,391 filed Jun. 29, 2005 under the title FLOWER SHIPPING AND ARRANGING CONTAINER by OTTO BULK.

FIELD OF THE INVENTION

This invention relates to containers for flowers and particularly relates to a container which can be used for both shipping and arranging a bunch of flowers.

BACKGROUND OF THE INVENTION

Generally flowers are grouped together by variety or name and packaged in groups of a predetermined number and bound together at the bottom portion of the stems and wrapped in cellophane. This is the prior art method for arranging a number of cut flowers and to date is the most common and efficient method for grouping flowers together. The difficulty with wrapping flowers in cellophane is the flowers do not come in the same shape or form and require certain elements in place in order to maintain their quality. The different shapes of flowers are determined by the bloom on the top of the flower, for example, some flowers bloom in the horizontal direction, whereas other bloom more predominantly in the vertical direction. This makes the requirements of floral packaging and transportation more difficult, particularly when flowers with a vertical bloom are being packaged using simple wrap cellophane as is currently done. Flowers with a horizontal bloom packaged in the current manner are often damaged and become unsaleable. Therefore, it is desirable to have a method of packaging cut flowers, particularly those that predominantly bloom in the horizontal direction that preserves and protects the bloom of the flower during shipping and handling.

The present invention is particularly useful for packaging of long stem flowers having little or no leaf, in particular varieties like Gerberas, Anthuriums, Arum Lilies and the like but can also be used with other varieties.

SUMMARY OF THE INVENTION

A flower shipping and arranging container comprising a planer flexible card having defined therein a number of apertures for receiving flower stems there through. The flower shipping and arranging container also includes sheet material wrapped around flexible card so as to create a hollow pocket between the sleeve and a front surface of flexible card thereby creating a protected environment for the flowers.

BRIEF DESCRIPTION OF THE DRAWINGS

The invention will now be described by way of example only with reference to the following drawings in which:

FIG. 7 is a schematic flow diagram for a system of packaging flowers.

DETAILED DESCRIPTION OF THE PREFERRED EMBODIMENT

Figure 1:
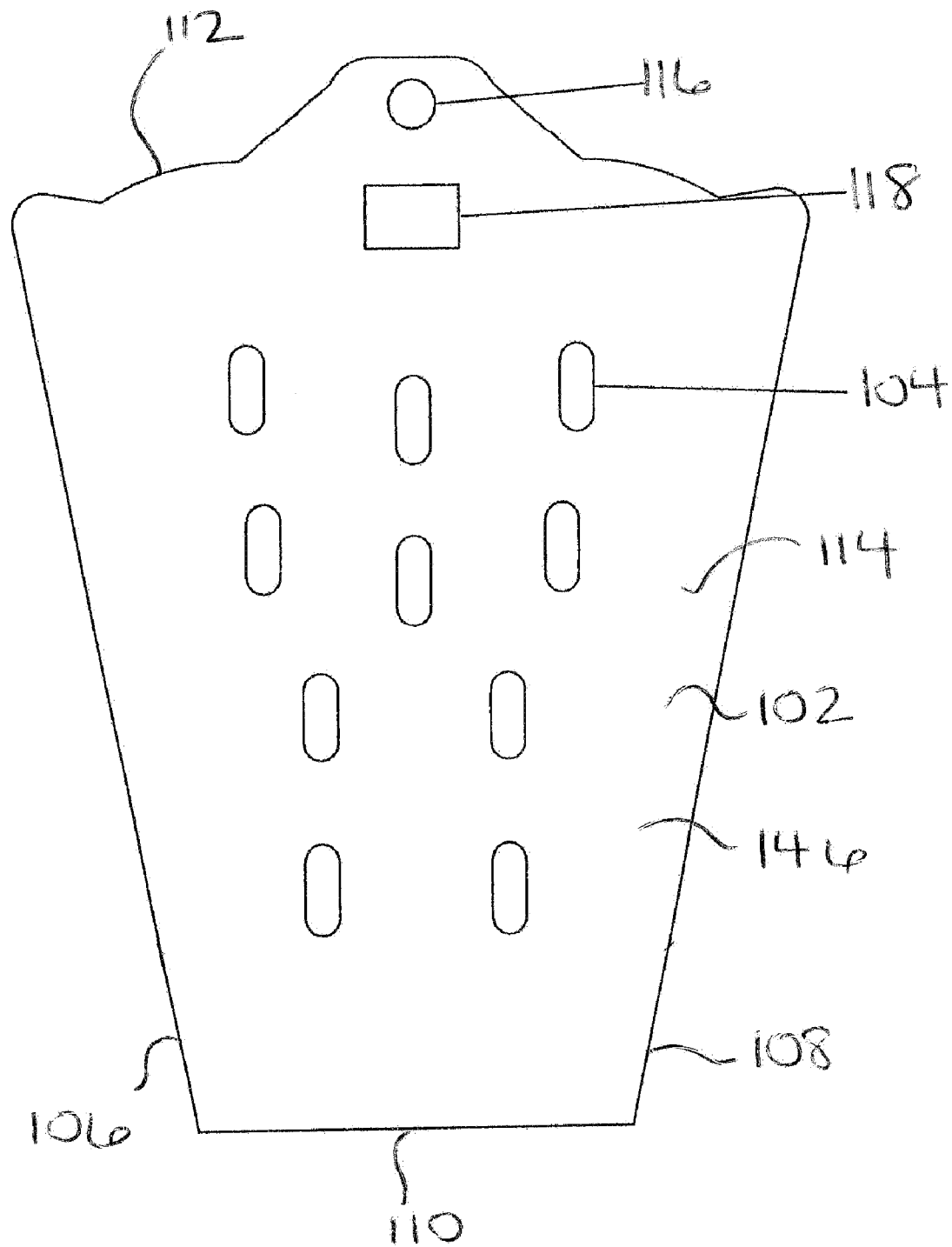
FIG. 1 is a front schematic elevational view of the flexible card used with the present invention, a flower shipping and arranging container.

The present invention a flower shipping and arranging container shown generally as 100 in FIGS. 1 through 5 includes a flexible card 102 having apertures 104 defined therein. The apertures preferably taking the shape of an oblong slot as shown FIG. 1. The flexible card 102 having a left edge 106, right edge 108, a bottom edge 110 and a top edge 112 in this particular embodiment. Flexible card 102 further includes a front surface 114 and a back surface 158 shown in FIG. 5. Flexible card 102 further includes a card hanger hole 116 and a location for a label or price slot 118. The card hanger hole located below the top edge 112 for vertically hanging the card on display.

The flexible card 102 preferably includes a moisture resistant coating denoted as wax coating 146 in FIG. 1. The coating may be any type known to resist moisture including but not limited to wax, and plastic coatings.

Figure 2:
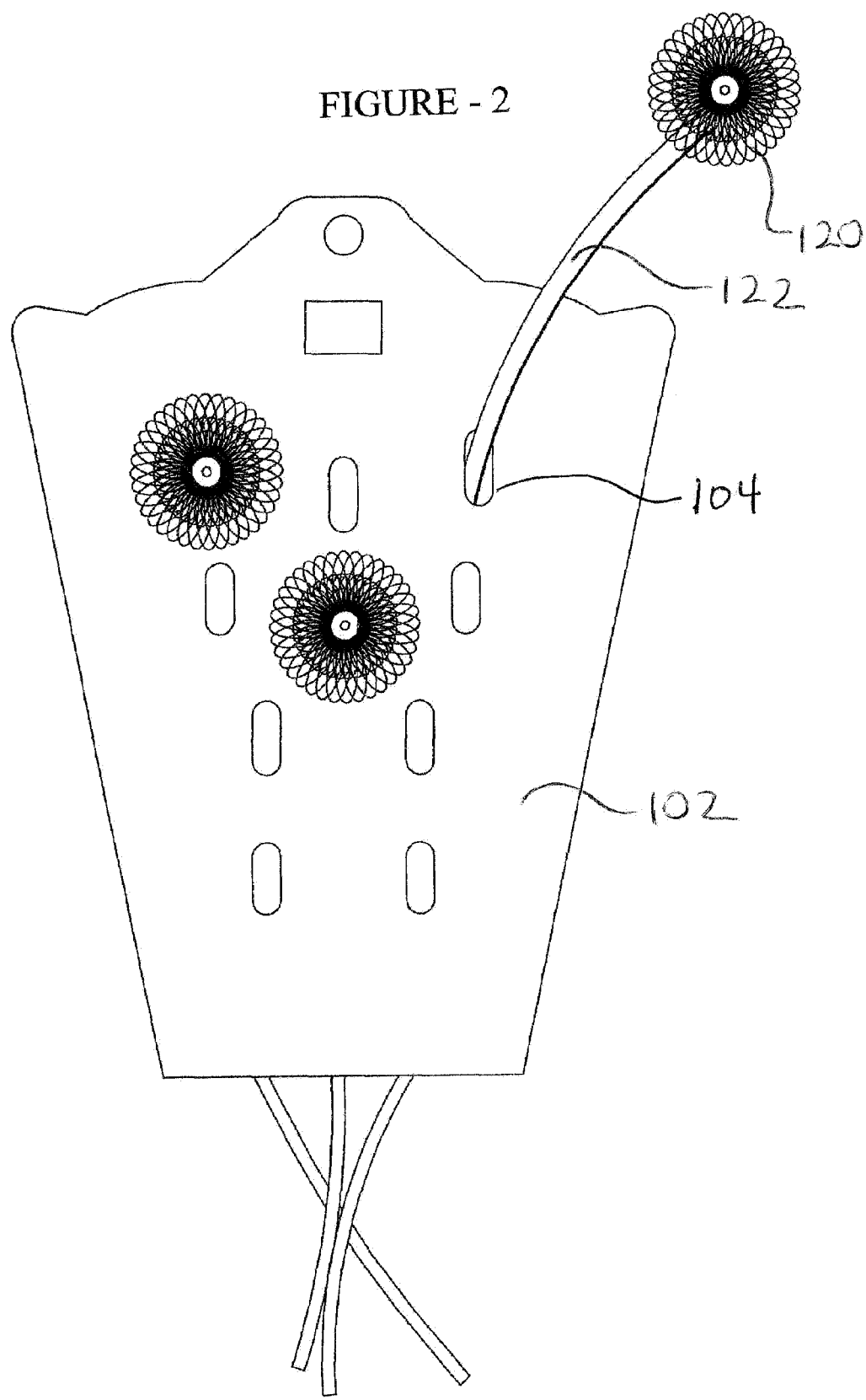
FIG. 2 is a front schematic elevational view of the flexible card together with flowers being positioned therein.

Flowers 120 are placed through apertures 104 defined in flexible card 102 as shown in FIG. 2, wherein stems 122 of flowers 120 located through apertures 104. Flexible card 102 can be made of any suitable material include paper and cardboard sheets, plastic sheet material and any other suitable sheet material.

Figure 3:
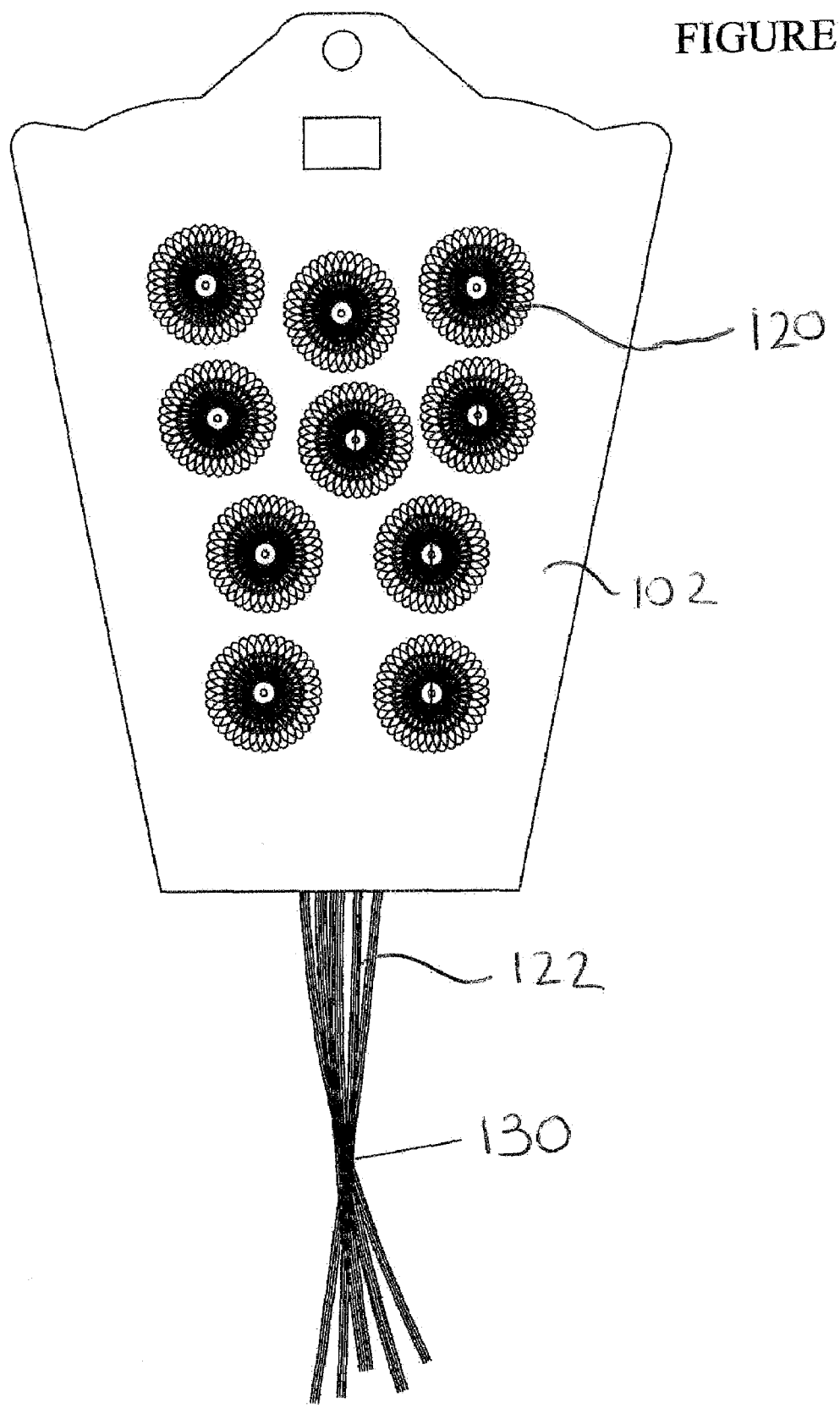
FIG. 3 is a front schematic elevational view of the flexible card together with all of the flowers in the arrangement or grouping mounted on the card together with a binding on the stems of the flowers.
Figure 4:
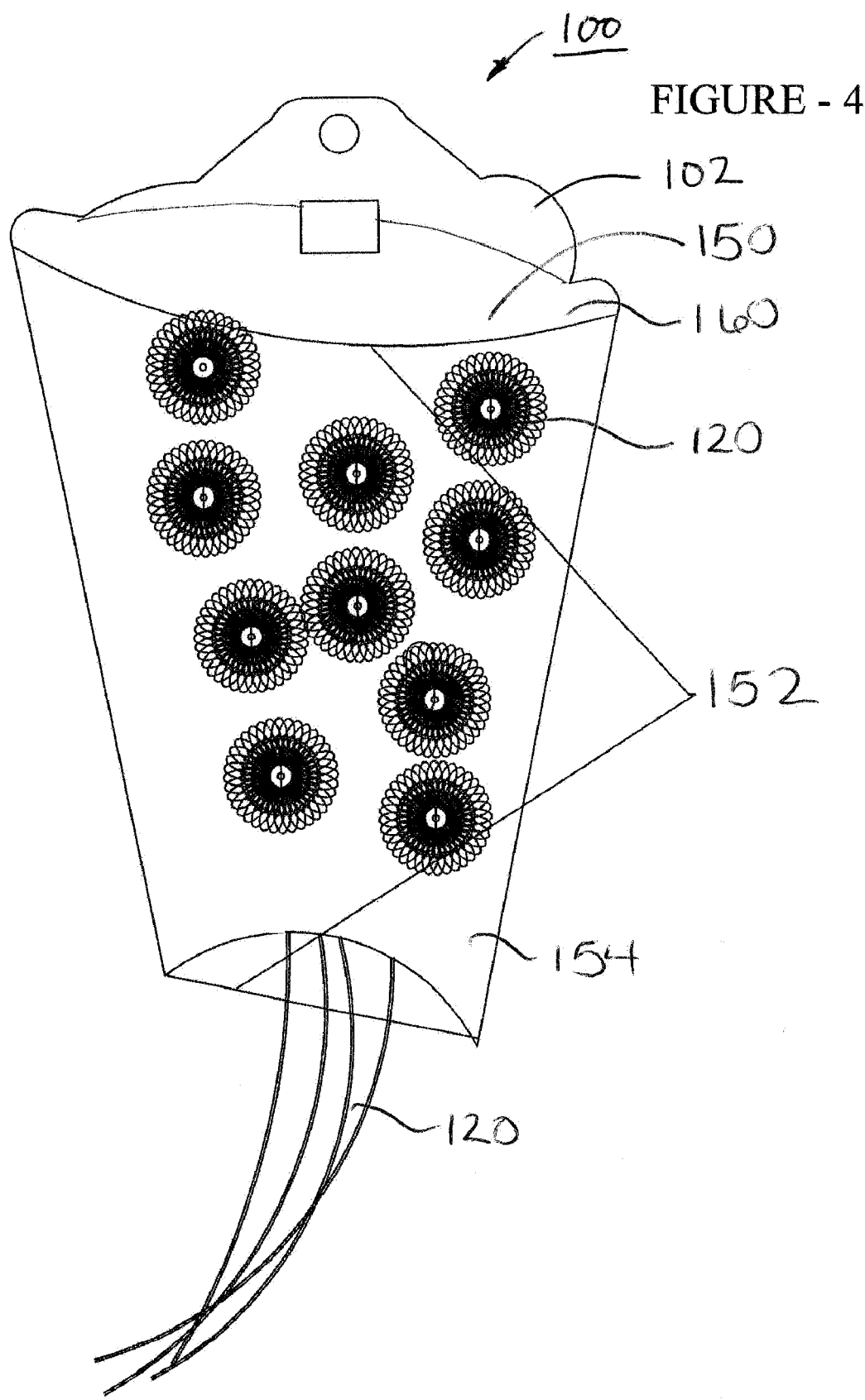
FIG. 4 is a front schematic perspective view of the present invention flower shipping and arranging container showing the flexible card together with flowers mounted therein, together with the sheet material mounted around the card.
Figure 5:
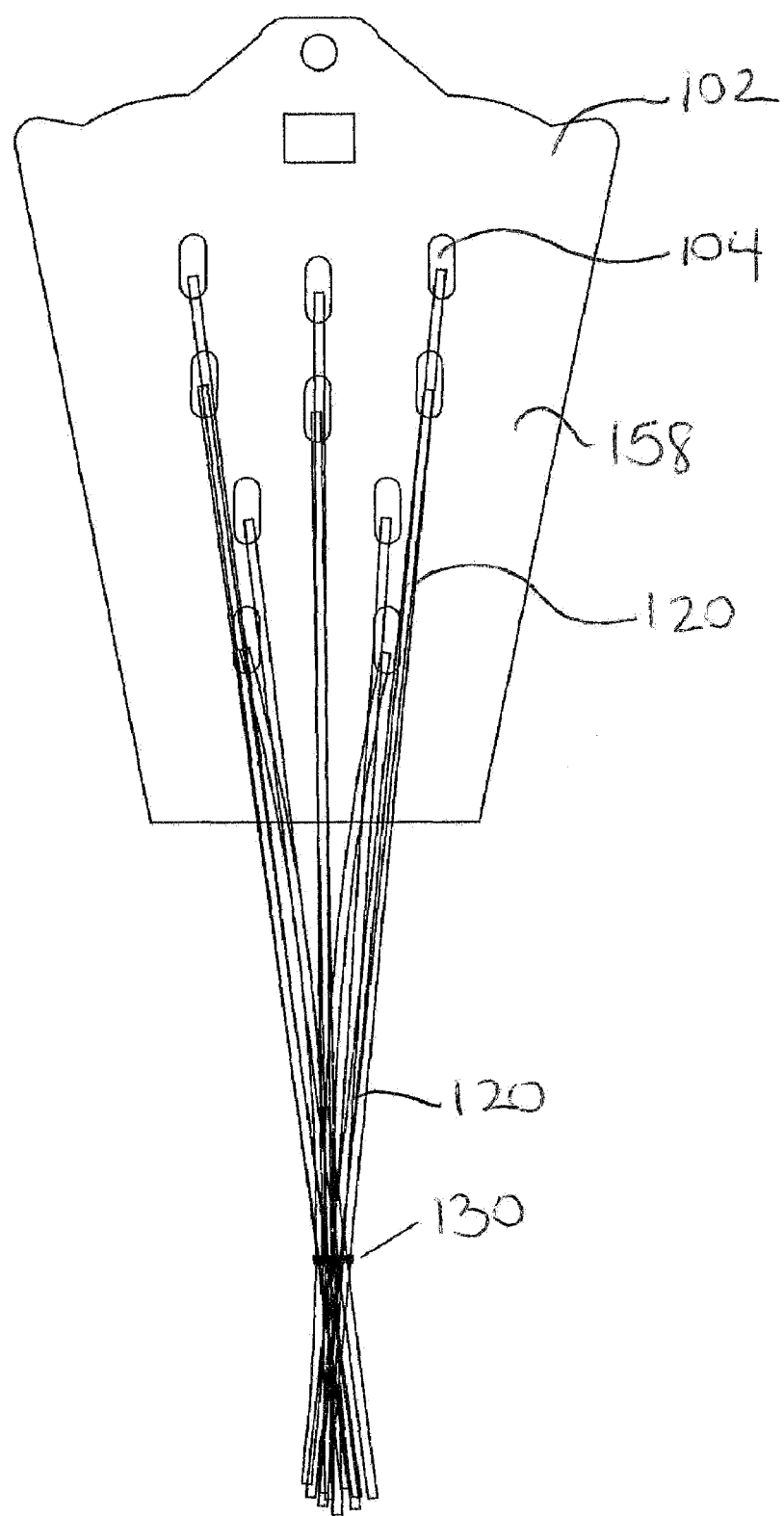
FIG. 5 is a rear schematic elevational view of the back surface of the flexible card showing the flower stems projecting there through and a binding.
Figure 6:
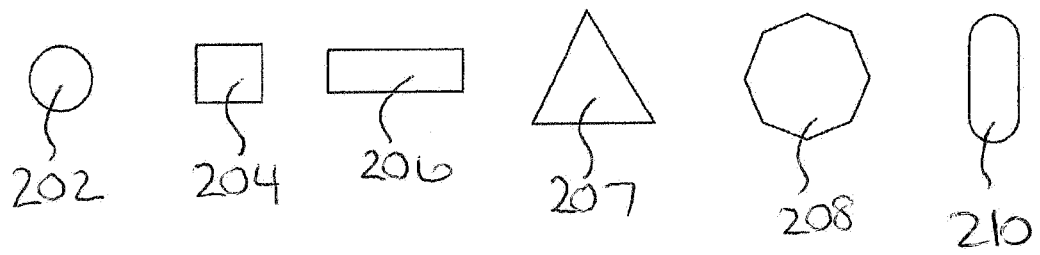
FIG. 6 is a schematic representation of other flexible card shapes that are possible, including circular, square, rectangular, triangular, hexagonal and oval.

Referring to FIG. 3, a grouping of flowers can be created as shown in FIG. 3, in which a number of flowers 120 are placed onto flexible card 102 with stems 122 projecting through flexible card 102 and having a bind 130 near the bottom of stems 122. The bind 130 including any material suitable for holding together stems 130 until container 100 is opened and the flowers 120 removed.

A sheet material 152 is wrapped around flexible card 102 in such a manner that flexible card is concavely bowed 160 to produce a hollow pocket 150 housing flowers 120 therein. In other words, pocket 150 is created between front surface 114 of flexible card 102 and sheet material front surface 154. Hollow pocket 150 is created by placing sheet material 152 in tension around flexible card 102, such that the tension forces on sheet material 152 concavely bow 160 flexible cards 102. Sheet material 152 makes contact with flexible card 102 at left edge 106 of flexible card 102 and right edge 108 of flexible card 102. Sheet material 152 may also make contact with back surface 158. By placing sheet material 152 in tension, right edge 108 is pulled toward left edge 106 and flexible card 102 is bowed concavely to form hollow pocket 150, thereby providing for a protective area in which flowers 120 are housed during shipping and future handling.

It will be apparent to a person skilled in the art that once sheet material 152 is removed from flexible card 102, the flower arrangement created on flexible card 102 can be used as a display presentation of the flowers. Sheet material 152 may be made of any suitable material, including but not limited to plastic, clear plastic, clear plastic film, mylar, cellophane, wax paper, other suitable sheet materials etc.

Hollow pocket 150 created by sheet material 152 and flexible card 102, effectively create a protective pocket in which the flowers are securely held and not damaged by either impinging upon each other and/or impinging upon other objects.

Flexible card 102 preferably has a coating applied to front surface 114 to ensure moisture and humidity resistance.

In an alternate embodiment, a system of packaging flowers is depicted in FIG. 7 schematically in flow diagram style. It uses the flower shipping and arranging container shown generally as 100 in FIGS. 1 through 5. The system of packaging flowers includes as depicted in FIG. 7:

Coating flexible card stock with a wax coating—302.

Die cutting card stock to produce flexible cards of desired shape—304.

Die cutting apertures in flexible cards to receive flower stems there through—306.

Placing flower stems through apertures in the flexible card with flower bloom mounted adjacent the front surface of the flexible card—308.

Wrapping sheet material around the flexible card, such that the front surface is concavely bowed thereby forming a protective hollow pocket between the sheet material and the front surface of the flexible card in which to house the flowers—310.

It should be apparent to persons skilled in the arts that various modifications and adaptation of this structure described above are possible without departure from the spirit of the invention the scope of which defined in the appended claim.

What is claimed is:

1. A method of packaging flowers including:
   (a) die cutting a card stock to produce a plurality of planar flexible cards of desired shape,
   (b) die cutting apertures in each of the flexible cards to receive flower stems there through,
   (c) placing flower stems of flowers through apertures in a flexible card of the plurality of flexible cards with flower bloom mounted adjacent a front surface of the flexible card and the stems adjacent a back surface of the flexible card.
   (d) wrapping sheet material around the flexible card under tension, such that the flexible card is concavely bowed thereby forming and maintaining a protective hollow pocket for housing the flower blooms between the sheet material and the front surface of the concavely bowed flexible card.

2. The method of packaging flowers claimed in claim 1 wherein the apertures include oblong slots adapted for receiving flower stems there through.

3. The method of packaging flowers claimed in claim 1 wherein the flexible card further including a card hanger hole below a top edge for hanging the card while it is being loaded with flowers and also for subsequent display of the flowers.

4. The method of packaging flowers claimed in claim 1 wherein the front surface of the planar flexible card is coated with a moisture resistant coating.

5. The method of packaging flowers claimed in claim 4 wherein the moisture resistant coating is a wax based moisture resistant coating.

6. The method of packaging flowers claimed in claim 1 wherein the sheet material includes clear cellophane film.

7. The method of packaging flowers claimed in claim 1 wherein a bind is attached around the stems to hold together the stems during shipping and handling.

8. A method of packaging flowers comprising the following steps:
   (a) coating a front side of a planar card stock with a moisture resistant coating,
   (b) die cutting the card stock to produce a plurality of planar flexible cards of desired shape including apertures at pre selected locations in each of the flexible cards to receive flower stems there through,
   (c) placing flower stems of flowers through apertures in a flexible card of the plurality of flexible cards with flower bloom mounted adjacent a front surface of the flexible card and the stems adjacent a back surface of the flexible card.
   (d) wrapping sheet material around the flexible card under tension, such that the flexible card is concavely bowed thereby forming and maintaining a protective hollow pocket for housing the flower blooms between the sheet material and the front surface of the concavely bowed flexible card.

9. The method of packaging flowers claimed in claim 8 wherein the apertures include oblong slots adapted for receiving flower stems there through.

10. A method of packaging flowers claimed in claim 8 wherein the sheet material includes clear cellophane film.

11. A method of packaging flowers claimed in claim 8 wherein a bind is attached around the stems to hold together the stems during shipping and handling.

12. A method of packaging flowers including:
   (a) die cutting a card stock to produce a plurality of planar flexible cards of desired shape,
   (b) die cutting apertures in each of the flexible cards to receive flower stems there through,
   (c) placing flower stems of flowers through apertures in a flexible card of the plurality of flexible cards with flower bloom mounted adjacent a front surface of the flexible card and the stems adjacent a back surface of the flexible card.
   (d) wrapping sheet material around the flexible card under tension wherein the tension on the sheet material pulls a right edge of the flexible card toward a left edge of the flexible card such that the flexible card is concavely bowed thereby forming and maintaining a protective hollow pocket for housing the flower blooms between the sheet material and the front surface of the concavely bowed flexible card.

* * * * *